(12) United States Patent
Liu

(10) Patent No.: US 10,146,408 B2
(45) Date of Patent: Dec. 4, 2018

(54) METHOD, SYSTEM AND TERMINAL FOR INTERFACE PRESENTATION

(71) Applicant: BEIJING QIHOO TECHNOLOGY COMPANY LIMITED, Beijing (CN)

(72) Inventor: Ke Liu, Beijing (CN)

(73) Assignee: BEIJING QIHOO TECHNOLOGY COMPANY LIMITED, Beijing (CN)

( * ) Notice: Subject to any disclaimer, the term of this patent is extended or adjusted under 35 U.S.C. 154(b) by 853 days.

(21) Appl. No.: 14/410,978

(22) PCT Filed: Jun. 13, 2013

(86) PCT No.: PCT/CN2013/077133
§ 371 (c)(1),
(2) Date: Dec. 23, 2014

(87) PCT Pub. No.: WO2014/000573
PCT Pub. Date: Jan. 3, 2014

(65) Prior Publication Data
US 2015/0212679 A1 Jul. 30, 2015

(30) Foreign Application Priority Data
Jun. 25, 2012 (CN) .......................... 2012 1 0214287

(51) Int. Cl.
G06F 3/048 (2013.01)
G06F 3/0484 (2013.01)
H04L 29/08 (2006.01)

(52) U.S. Cl.
CPC ........ *G06F 3/0484* (2013.01); *H04L 67/1097* (2013.01); *H04L 67/36* (2013.01)

(58) Field of Classification Search
CPC ...... G06F 3/01; G06F 15/16; G06F 17/30011; H04L 65/403
See application file for complete search history.

(56) References Cited

U.S. PATENT DOCUMENTS 8,001,145 B1 * 8/2011 Cornali .............. G06Q 30/0603
707/779
2009/0265637 A1 * 10/2009 Lee ....................... G06F 9/4443
715/738

(Continued)

OTHER PUBLICATIONS

International Search Report regarding PCT/CN2013/077133 dated Oct. 3, 2013, two pages.

(Continued)

Primary Examiner — Rashawn N Tillery
(74) Attorney, Agent, or Firm — Baker & Hostetler LLP

(57) ABSTRACT

The invention discloses a method, system and terminal for interface presentation. The method comprises: a first terminal receiving a request message for saving the current user interface, capturing the current interface information based on the request message, and uploading the interface information to a network storage server; a second terminal receiving a triggering instruction, initiating to the network storage server a request for invoking the interface information, constructing a user executable interface with the invoked interface information, and presenting the constructed interface. The invention uploads interface information to a network storage server by way of an interface presentation initiating side, and invokes the network storage server by way of an interface presentation receiving side, so as to achieve remote asynchronous sharing of the interface information of the interface presentation initiating side, and the sharing mode is independent of the operating state of the interface presentation initiating side and the current interface display condition thereof, and is flexible to be implemented.

19 Claims, 3 Drawing Sheets

(56) References Cited

U.S. PATENT DOCUMENTS

| | | | | |
|---|---|---|---|---|
| 2011/0126130 A1* | 5/2011 | Lieb | ..................... | G06F 3/1454 |
| | | | | 715/753 |
| 2012/0030579 A1* | 2/2012 | Morard | .............. | H04L 12/1822 |
| | | | | 715/740 |
| 2013/0132870 A1* | 5/2013 | Vishnubhatta | ........ | G06F 3/0481 |
| | | | | 715/762 |
| 2013/0254259 A1* | 9/2013 | Wilson | .............. | G06F 17/30876 |
| | | | | 709/203 |

OTHER PUBLICATIONS

English translation of abstract only of Chinese application CN102362477A, Title: Method for the remote sharing of computer office(s), Publication Date: Feb. 22, 2012, Country: CN, Inventor(s): Jean-Pierre Morard et al., one page.

English translation of abstract only of Chinese application CN101820430A, Title: Method and device for realizing file sharing in IMS WEB meeting, Publication Date: Sep. 1, 2010, Country: CN, Inventor(s): Quanmin Ge et al., one page.

English translation of abstract only of Chinese application CN101583009A, Title: Video terminal and method thereof for realizing interface content sharing, Publication Date: Nov. 18, 2009, Country: CN, Inventor(s): Lianchao Zhang et al., one page.

* cited by examiner

METHOD, SYSTEM AND TERMINAL FOR INTERFACE PRESENTATION

FIELD OF THE INVENTION

The invention relates to the field of internet technologies, and in particular, to a method, system and terminal for interface presentation.

BACKGROUND OF THE INVENTION

Nowadays, the cloud disk technology or the personal network U disk storage technology can only store a single or bulk data file or document material(s). If a user needs to download document work unfinished in a corporation to a home computer to continue his work utilizing a cloud disk or a network disk, the user needs to carry out tedious operations of selecting files one by one, uploading them in sequence, and selecting and downloading in sequence on the network disk each time, and in such a process some documents or materials may be missed, which makes the use efficiency of the user low. In addition, an interface remote operation may realize a remote control technique, which allows a user to access a computer providing the service of remote desktop sharing from a local area network (LAN) or a wide area network (WAN) through the TCP/IP protocol. The user logs in the computer remotely, as if he operates on his own computer, and the used interface is identical to that of the remote computer. In other words, the user uses a computer A, remotely logs in a computer B, and may operate directly on the computer B. However, this remote control technique has the following problems: first, the computer B must be kept in a switched-on state all the time, and when the computer B is in a switched-off state, the sharing cannot be realized; second, when the user uses the remote control technique, he needs to invoke a system program to perform a complex setup, which is not conducive to the widespread use by users; and third, the current remote desktop sharing technique does not satisfy the cross-platform use.

SUMMARY OF THE INVENTION

In view of the above problems, the invention is proposed to provide a method, system and terminal for interface presentation which overcome the above problems or at least in part solve or mitigate the above problems.

According to an aspect of the invention, there is provided a method for interface presentation, which comprises: a first terminal receiving a request message for saving the current user interface, capturing the current interface information based on the request message, and uploading the interface information to a network storage server; a second terminal receiving a triggering instruction, initiating to the network storage server a request for invoking the interface information, constructing a user executable interface with the invoked interface information, and presenting the constructed interface.

According to another aspect of the invention, there is provided a system for interface presentation, which comprises: a first terminal configured to receive a request message for saving the current user interface, capture the current interface information based on the request message, and upload the interface information to a network storage server; a second terminal configured to receive a triggering instruction, initiate to the network storage server a request for invoking the interface information, construct a user executable interface with the invoked interface information, and present the constructed interface; and the network storage server configured to store the interface information uploaded by the first terminal, and provide the second terminal with an interface for invoking the interface information.

According to a further aspect of the invention, there is provided a terminal for interface presentation, which comprises: an interface storage configured to, when the terminal is taken as an interface presentation initiating side, receive a request message for saving the current user interface, capture the current interface information based on the request message, and upload the interface information to a network storage server; an interface display configured to, when the terminal is taken as an interface presentation receiving side, receive a triggering instruction, initiate to the network storage server a request for invoking the interface information, construct a user executable interface with the invoked interface information, and present the constructed interface.

According to yet another aspect of the invention, there is provided a computer program comprising a computer readable code which causes a server to perform the method for interface presentation according to any of claims 1-14, when said computer readable code is running on the server.

According to still another aspect of the invention, there is provided a computer readable medium storing the computer program.

The beneficial effects of the invention lie in that:

Firstly, the invention uploads interface information to a network storage server by way of an interface presentation initiating side, and invokes the network storage server by way of an interface presentation receiving side, so as to achieve remote asynchronous sharing of the interface information of the interface presentation initiating side;

Secondly, the remote asynchronous sharing mode of the invention is independent of the operating state of the interface presentation initiating side and the current interface display condition thereof, and is flexible to be implemented;

Thirdly, in the invention, the terminal only needs to initiate to the network storage server a storage request and an invocation request, does not need to perform a complex setup, and its operations are simple and convenient;

Fourthly, upon interface presentation, the invention uploads not only the backup of a file, but also the positions and layout of individual elements within an interface, and the background of the interface, etc. to the network storage server, such that the interface presentation receiving side can present an interface consistent with a user's use habit to the user, which enhances continuity of work and improves the user's use experience; and Fifthly, the invention can not only realize remote asynchronous sharing of an interface, but also realize dual presentation of desktop information and task information, which further enhances continuity of work and user's experience.

The above description is merely an overview of the technical solutions of the invention. In the following particular embodiments of the invention will be illustrated in order that the technical means of the invention can be more clearly understood and thus may be embodied according to the content of the specification, and that the foregoing and other objects, features and advantages of the invention can be more apparent.

BRIEF DESCRIPTION OF THE DRAWINGS

Various other advantages and benefits will become apparent to those of ordinary skills in the art by reading the following detailed description of the preferred embodiments. The drawings are only for the purpose of showing the preferred embodiments, and are not considered to be limiting to the invention. And throughout the drawings, like reference signs are used to denote like components. In the drawings.

DETAILED DESCRIPTION OF THE INVENTION

In the following the invention will be further described in connection with the drawings and the particular embodiments.

In order to resolve the problems in the prior art in which use of network storage can only store specified files, the operations are tedious, the efficiency is low, and the asynchronous sharing of an interface cannot be satisfied, the invention provides such a method, system and terminal for interface presentation. In the following, the invention will be further described in detail in connection with the drawings and embodiments. It should be understood that the particular embodiments described herein are only used for explaining and not defining the invention.

First Embodiment

Figure 1:
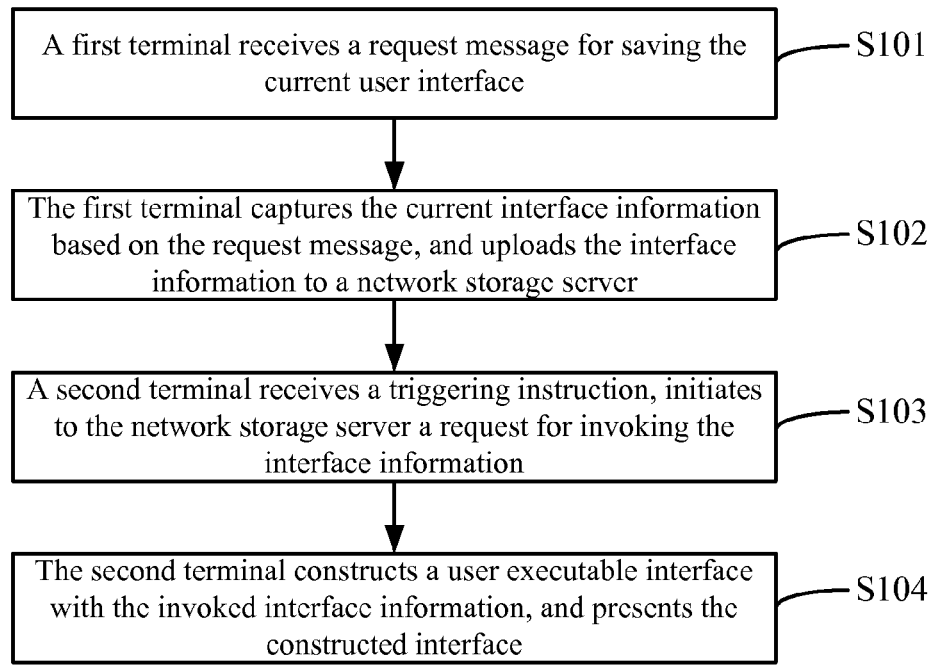
FIG. 1 shows schematically a flow chart of a method for interface presentation according to a first embodiment of the invention.

An embodiment of the invention provides a method for interface presentation, and as shown in FIG. 1, the method comprises the following steps.

Step S101: a first terminal receives a request message for saving the current user interface;

Step S102: the first terminal captures the current interface information based on the request message, and uploads the interface information to a network storage server.

In this step, the interface information comprises: elements (including file(s) and application(s), etc.) on an interface of the first terminal, and layout information of individual elements on the interface; preferably, the interface information further comprises background information of the interface.

Preferably, in this step, when the first terminal uploads the interface information to the network storage server, if the corresponding interface information is the shortcut icon of an element, the first terminal locates a target file corresponding to the shortcut icon, and uploads the target file to the network storage server.

Preferably, in this step, the network storage server is a cloud disk server, for example, a 360 cloud disk, etc.

Step S103: a second terminal receives a triggering instruction, and initiates to the network storage server a request for invoking the interface information; Step S104: the second terminal constructs a user executable interface with the invoked interface information, and presents the constructed interface.

In this step, the manner in which the second terminal presents the constructed interface comprises: displaying the constructed user executable interface in a standalone window, or copying the constructed user executable interface to the interface of the second terminal for full-screen display. Therein, when displaying in a standalone window, it may be presented in the form of a 360 secure desktop, presented in various open platform interfaces, or presented in the form of a webpage browser.

Further, in this step, after the second terminal displays the user executable interface, it may receive a relevant instruction of a user to perform a triggering operation on a corresponding element in the executable interface.

It needs to be noted that in the invention, when the second terminal presents the constructed interface, the state of the first terminal may be a switched-on state, or also may be a switched-off state; and the interface presented by the second terminal corresponds to the interface information saved by the network storage server. It can be seen that, the implementation of the method for interface presentation of the invention does not depend on the operating state of the first terminal and the current interface display condition of the first terminal, thereby overcoming the problem in the prior art in which remote asynchronous presentation of an interface can not be accomplished. Meanwhile, for applying the method of this embodiment, the user only needs to initiate a storage request and an invocation request to the network storage server, for which the operation is simple and convenient, and which also overcomes the problem of the setting operation being complex, etc. in the prior art.

In addition, it needs to be further noted that, in this embodiment, that the process of uploading the interface information of the first terminal to the network storage server is different from the traditional process of uploading a network file. Taking that the network storage server is a cloud disk server as an example, the traditional cloud disk technique can only be operated by a user using a computer A (e.g., of a workplace) to specify a specific file to be uploaded to the cloud, and then the user returning home to use a computer B to download the file from the cloud. However, often the work computer A and the home computer B are different in their systems, interfaces, desktop layouts, and storage locations, and only a certain file is downloaded for use, and there is no continuity of work experience, which greatly affects the work efficiency. Yet in the invention, after the user sends out a request for uploading an interface, the first terminal uploads to the network storage server all the interface information, comprising individual elements on the interface, the information on the positions and layout of the individual elements, and the background information of the interface, etc., and when the user invokes the interface information through the second terminal, the interface information of the first terminal may be fully presented on the second terminal, which greatly improves the user's experience.

In order to more clearly set forth the particular implementation process of this embodiment and the achieved effect, in the following the method of the invention will be described in detail with a particular example, which is as follows:

When a user works on a work computer, he classifies and stores materials, applications, etc. commonly used in work on the desktop, and lays out the classified individual files in a manner that he easily finds them himself.

When the user has a need for remote interface presentation: the user may invoke or trigger a cloud disk server on the work computer, and upload to the cloud disk server the current interface information of the work computer, such as elements on the interface, information on the positions where the individual elements are located, the layout information of the individual elements, and the background information of the interface, etc.;

When the user needs remote presentation, he invokes or triggers the cloud disk server on a current application computer, and presents the interface information of the work computer saved by the cloud disk server alone after it is invoked. At this point, the presented interface is exactly identical to the interface information of the work computer when it is saved.

After the remote interface presentation by the user, since the displayed interface is exactly identical to the work interface, it is convenient for the user to find and retrieve material(s), which greatly increases the work efficiency of the user.

Second Embodiment

An embodiment of the invention provides a method for interface presentation, the way of implementation of this method is essentially identical to that of the method for presentation of the first embodiment, the difference lies in the captured interface information and the presented content of the interface, and therefore, in the following illustration, the processing mode identical to that of the first embodiment will not be repeated here. Continue as shown in FIG. 1, the method comprises the following steps.

Step S101: a first terminal receives a request message for saving the current user interface;

Step S102: the first terminal captures the current interface information based on the request message, and uploads the interface information to a network storage server.

In this step, the interface information comprises: elements on an interface of the first terminal, layout information of individual elements on the interface and the task information in a taskbar of the first terminal; preferably, the interface information further comprises background information of the interface. Therein, the task information is preferably a uniform resource locator URL browsed via a browser and/or a file currently opened by a user.

Further, in this step, when the task information is a file currently opened by a user, the first terminal judges whether the file is stored on the interface, and if yes, marks the status of the file as being opened, and uploads the file name and the marked status of the file to the network storage server; otherwise, locates the actual storage location of the file, marks the status information of the file as being opened after obtaining the file, and uploads the file and the marked status information together to the network storage server.

When the task information is a URL currently browsed via a browser, the first terminal captures the URL information currently browsed via the browser, and uploads the URL information currently browsed via the browser to the network storage server.

Step S103: a second terminal receives a triggering instruction, and initiates to the network storage server a request for invoking the interface information;

Step S104: the second terminal constructs a user executable interface with the invoked interface information, and presents the constructed interface.

In this step, that the second terminal constructs a user executable interface with the invoked interface information and presents the constructed interface particularly comprises: the second terminal constructs a user executable interface based on elements on the interface of the first terminal and the layout information of individual elements, and displays the executable interface in a standalone window, or copies it to the interface of the second terminal for full-screen display, and constructs a taskbar in the display window, and create a task corresponding to the task information in the taskbar.

Therein, since when the first terminal uploads the task information, it has conducted status recording for the opened file and conducted URL recording for the opened browser, the creation of the above task may be realized.

From the above, this embodiment realizes dual presentation of desktop information and task information, which further enhances continuity of work and improves user's experience.

Third Embodiment

Figure 2:
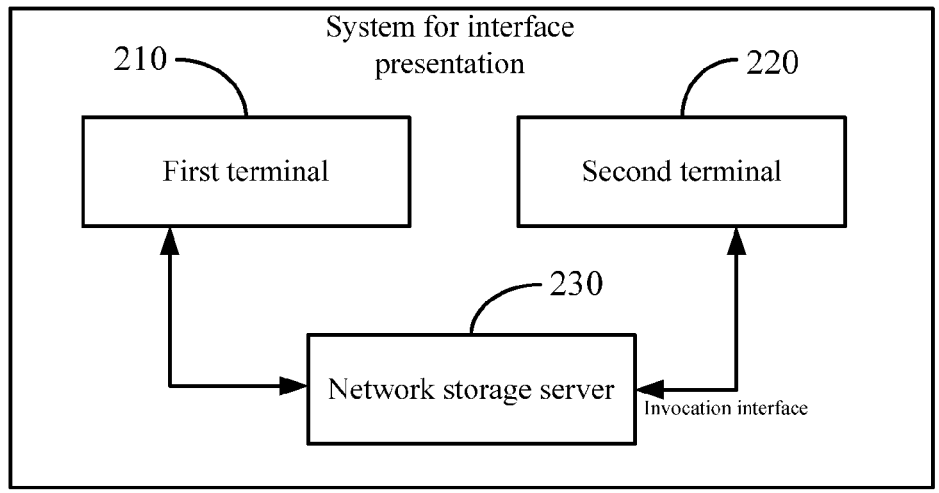
FIG. 2 shows schematically a structure diagram of a system for interface presentation according to a third embodiment of the invention.

An embodiment of the invention provides a system for interface presentation, which, as shown in FIG. 2, comprises: a first terminal 210, a second terminal 220 and a network storage server 230.

The first terminal 210 is configured to receive a request message for saving the current user interface, capture the current interface information based on the request message, and upload the interface information to the network storage server 230;

wherein the interface information comprises: elements on an interface of the first terminal, and layout information of individual elements on the interface; preferably, it further comprises background information of the interface of the first terminal.

Preferably, the first terminal 210 is further configured to, when an element on the interface is a shortcut icon, locate a target file corresponding to the shortcut icon, and upload the target file to the network storage server 230.

The second terminal 220 is configured to receive a triggering instruction, initiate to the network storage server 230 a request for invoking the interface information, construct a user executable interface with the invoked interface information, and present the constructed interface.

Preferably, the second terminal 220 displays the constructed user executable interface in a standalone window, or copies the constructed user executable interface to the interface of the second terminal for full-screen display.

Further, the second terminal 220 is further configured to, after presenting the interface, receive an instruction to perform an operation on an element and/or task in the interface.

Further, when the second terminal 220 presents the constructed interface, the state of the first terminal 210 is a switched-on state, or a switched-off state; and the interface presented by the second terminal 220 corresponds to the interface information saved by the network storage server 230.

The network storage server 230 is configured to store the interface information uploaded by the first terminal 210, and provide the second terminal 220 with an interface for invoking the interface information.

Therein, the network storage server 230 is preferably a cloud disk server, for example, a 360 cloud disk, etc.

From the above, in the system as described in this embodiment, the first terminal uploads the interface information to the network storage server, and the second terminal invokes the network storage server so as to realize remote presentation of the interface information of the first terminal. This manner of presentation is independent of the operating state of the first terminal and the current interface display condition thereof, thereby overcoming the problem in the prior art in which remote asynchronous presentation of an interface can not be accomplished. Meanwhile, for applying the system of this embodiment, the terminal only needs to initiate a storage request and an invocation request to the network storage server, for which the operation is simple and convenient, and which also overcomes the problem of the setting operation being complex, etc. in the prior art.

Fourth Embodiment

This embodiment provides a system for interface presentation, the way of implementation of this system is essentially identical to that of the system of the third embodiment, the difference lies in the captured interface information and the presented content of the interface, and therefore, in the following illustration, the processing mode identical to that of the third embodiment will not be repeated here. Continue as shown in FIG. 2, the system comprises a first terminal 210, a second terminal 220 and a network storage server 230.

The first terminal 210 is configured to receive a request message for saving the current user interface, capture the current interface information based on the request message, and upload the interface information to the network storage server;

wherein the interface information comprises: elements on an interface of the first terminal, layout information of individual elements on the interface and the task information in a taskbar of the first terminal; preferably, the interface information further comprises background information of the interface of the first terminal. Therein, the task information is preferably a uniform resource locator URL browsed via a browser and/or a file currently opened by a user.

Further, the first terminal 210 is further configured to, when the task information is a file currently opened by a user, judge whether the file is stored on the interface, and if yes, mark the status of the file as being opened, and upload the file name and the marked status of the file to the network storage server 230; otherwise, locate the actual storage location of the file, mark the status information of the file as being opened after obtaining the file, and upload the file and the marked status information together to the network storage server 230.

Further, the first terminal 210 is further configured to, when the task information is a URL currently browsed via a browser, capture the URL information currently browsed via the browser, and upload the URL information currently browsed via the browser to the network storage server 230.

The second terminal 220 is configured to receive a triggering instruction, initiate to the network storage server 230 a request for invoking the interface information, construct a user executable interface with the invoked interface information, and present the constructed interface.

In particular, the second terminal 220 constructs a user executable interface based on elements on the interface of the first terminal and the layout information of individual elements, and displays the executable interface in a standalone window, or copies it to the interface of the second terminal for full-screen display, and constructs a taskbar in the display window, and creates a task corresponding to the task information in the taskbar.

The network storage server 230 is configured to store the interface information uploaded by the first terminal 210, and provide the second terminal 220 with an interface for invoking the interface information.

From the above, the system of this embodiment can not only realize remote asynchronous sharing of an interface, but also realize dual presentation of desktop information and task information, which further enhances continuity of work and improves user's experience.

Fifth Embodiment

Figure 3:
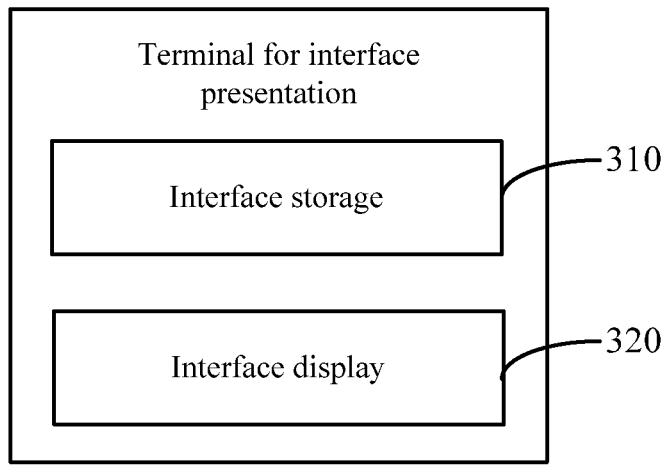
FIG. 3 shows schematically a structure diagram of a terminal for interface presentation according to a fifth embodiment of the invention.

This embodiment provides a terminal for interface presentation, which, as shown in FIG. 3, comprises: an interface storage 310 and an interface display 320.

The interface storage 310 is configured to, when the terminal is taken as an interface presentation initiating side, receive a request message for saving the current user interface, capture the current interface information based on the request message, and upload the interface information to a network storage server;

wherein the interface information comprises: elements on an interface of the terminal, and layout information of individual elements on the interface; preferably, it further comprises background information of the interface of the terminal.

Preferably, when an element on the interface of the terminal is a shortcut icon, the interface storage 310 locates a target file corresponding to the shortcut icon, and uploads the target file to the network storage server.

The interface display 320 is configured to, when the terminal is taken as an interface presentation receiving side, receive a triggering instruction, initiate to the network storage server a request for invoking the interface information, construct a user executable interface with the invoked interface information, and present the constructed interface.

Preferably, the interface display 320 displays the constructed user executable interface in a standalone window, or copies the constructed user executable interface to the interface of the current terminal for full-screen display.

Therein, the interface presented by the interface display 320 corresponds to the interface information saved by the network storage server; and furthermore, after presenting the interface, the interface display 320 receives a user's instruction to perform an operation on an element and/or task in the interface.

From the above, the terminal of this embodiment realizes remote asynchronous sharing of an interface, and the manner of sharing is independent of the operating state of the interface presentation initiating side and the current interface display condition thereof. Meanwhile, the terminal only needs to initiate to the network storage server a storage request and an invocation request, for which the operation is simple and convenient, and which also overcomes the problem of the setting operation being complex, etc. in the prior art.

Sixth Embodiment

Figure 4:
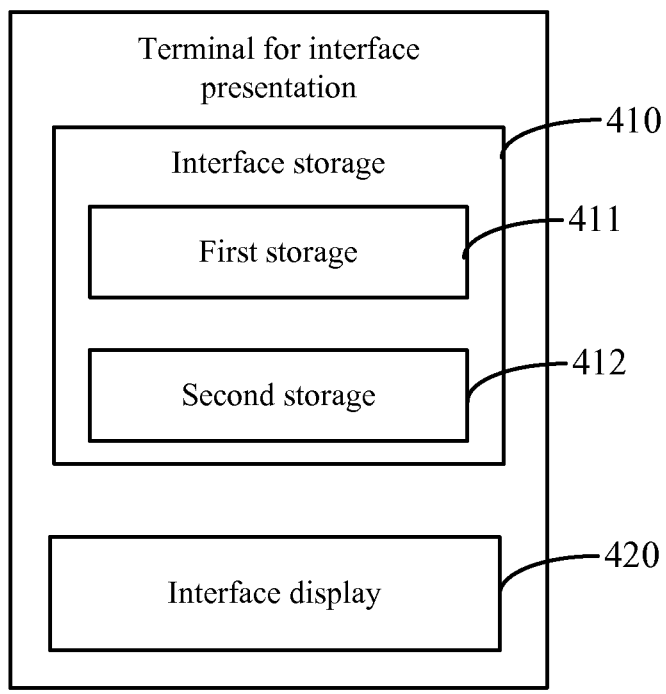
FIG. 4 shows schematically a structure diagram of a terminal for interface presentation according to a sixth embodiment of the invention.

This embodiment provides a terminal for interface presentation, the way of implementation of this terminal for interface presentation is essentially identical to that of the terminal of the fifth embodiment, the difference lies in the adopted interface information and the presentation mode of the interface, and therefore, in the following illustration, the processing mode identical to that of the fifth embodiment will not be repeated here. Continue as shown in FIG. 4, the terminal for interface presentation comprises: an interface storage 410 and an interface display 420.

The interface storage 410 is configured to, when the terminal is taken as an interface presentation initiating side, receive a request message for saving the current user interface, capture the current interface information based on the request message, and upload the interface information to a network storage server;

wherein the interface information comprises: elements on an interface of the terminal, layout information of individual elements on the interface and the task information in a taskbar of the terminal; preferably, the interface information further comprises background information of the interface of the terminal. Therein, the task information is preferably a uniform resource locator URL browsed via a browser and/or a file currently opened by a user.

Preferably, the interface storage 410 further comprises:

a first storage 411 configured to, when the task information is a file currently opened by a user, judge whether the file is stored on the interface, and if yes, mark the status of the file as being opened, and upload the file name and the marked status of the file to the network storage server; otherwise, locate the actual storage location of the file, mark the status information of the file as being opened after obtaining the file, and upload the file and the marked status information together to the network storage server; and a second storage 412 configured to, when the task information is a URL currently browsed via a browser, capture the URL information currently browsed via the browser, and upload the URL information to the network storage server.

The interface display 420 is configured to, when the terminal is taken as an interface presentation receiving side, receive a triggering instruction, initiate to the network storage server a request for invoking the interface information, construct a user executable interface with the invoked interface information, and present the constructed interface.

Preferably, the interface display 420 constructs a user executable interface based on elements on the interface of the synchronous initiating side and the layout information of individual elements, and displays the executable interface in a standalone window, or copies it to the interface of the current terminal for full-screen display, and constructs a taskbar in the display window, and creates a task corresponding to the task information in the taskbar.

From the above, the terminal of this embodiment can not only realize remote asynchronous sharing of an interface, but also realize dual presentation of desktop information and task information, which further enhances continuity of work and improves user's experience.

Embodiments of the individual components of the invention may be implemented in hardware, or in a software module running on one or more processors, or in a combination thereof. It will be appreciated by those skilled in the art that, in practice, some or all of the functions of some or all of the components in the system and terminal for interface presentation according to individual embodiments of the invention may be realized using a microprocessor or a digital signal processor (DSP). The invention may also be implemented as an apparatus or device program (e.g., a computer program and a computer program product) for carrying out a part or all of the method as described herein. Such a program implementing the invention may be stored on a computer readable medium, or may be in the form of one or more signals. Such a signal may be obtained by downloading it from an Internet website, or provided on a carrier signal, or provided in any other form.

Figure 5:
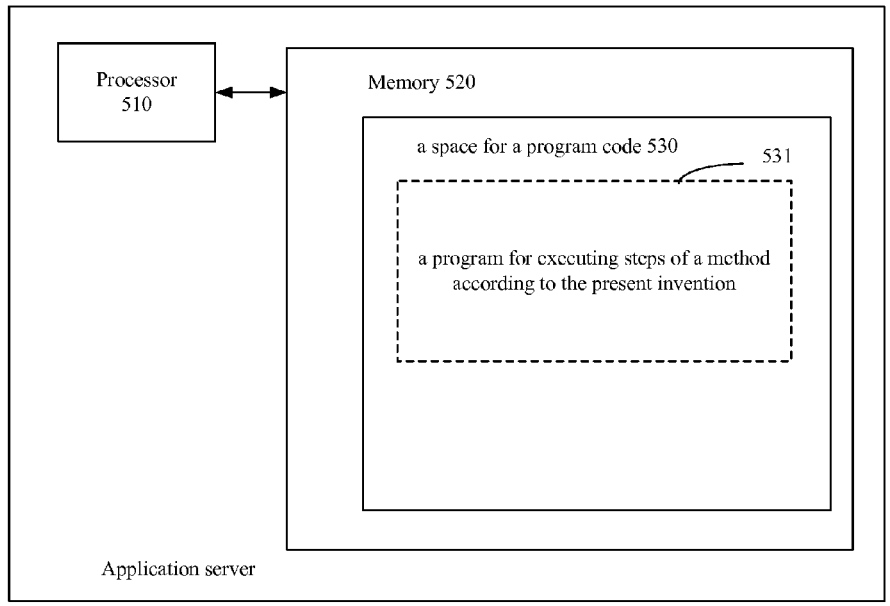
FIG. 5 shows schematically a block diagram of a server for performing a method according to the invention.
Figure 6:
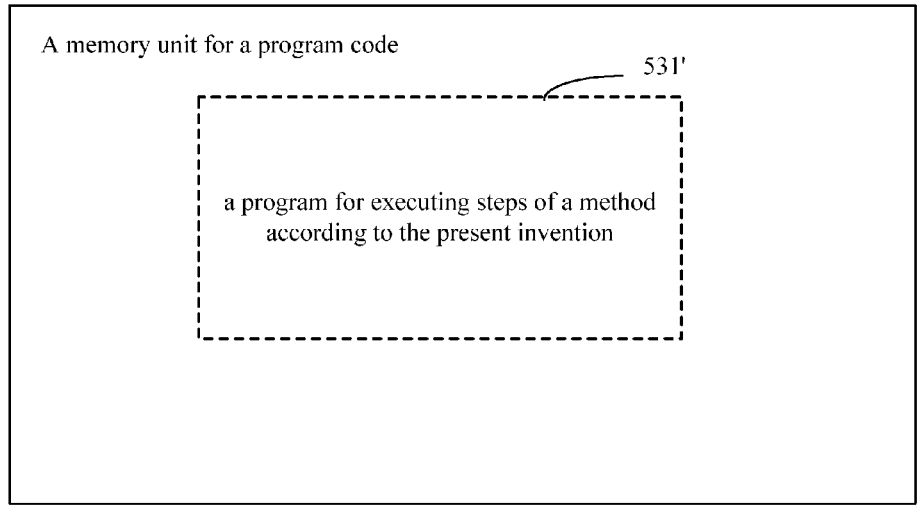
FIG. 6 shows schematically a storage unit for retaining or carrying a program code implementing a method according to the invention.

For example, FIG. 5 shows a server which may carry out a method for interface presentation according to the invention, e.g., an application server. The server traditionally comprises a processor 510 and a computer program product or a computer readable medium in the form of a memory 520. The memory 520 may be an electronic memory such as a flash memory, an EEPROM (electrically erasable programmable read-only memory), an EPROM, a hard disk or a ROM. The memory 520 has a memory space 530 for a program code 531 for carrying out any method steps in the methods as described above. For example, the memory space 530 for a program code may comprise individual program codes 531 for carrying out individual steps in the above methods, respectively. The program codes may be read out from or written to one or more computer program products. These computer program products comprise such a program code carrier as a hard disk, a compact disk (CD), a memory card or a floppy disk. Such a computer program product is generally a portable or stationary storage unit as described with reference to FIG. 6. The storage unit may have a memory segment, a memory space, etc. arranged similarly to the memory 520 in the server of FIG. 5. The program code may for example be compressed in an appropriate form. In general, the storage unit comprises a computer readable code 531', i.e., a code which may be read by e.g., a processor such as 510, and when run by a server, the codes cause the server to carry out individual steps in the methods described above.

"An embodiment", "the embodiment" or "one or more embodiments" mentioned herein implies that a particular feature, structure or characteristic described in connection with an embodiment is included in at least one embodiment of the invention. In addition, it is to be noted that, examples of a phrase "in an embodiment" herein do not necessarily all refer to one and the same embodiment.

In the specification provided herein, a plenty of particular details are described. However, it can be appreciated that an embodiment of the invention may be practiced without these particular details. In some embodiments, well known methods, structures and technologies are not illustrated in detail so as not to obscure the understanding of the specification.

It is to be noted that the above embodiments illustrate rather than limit the invention, and those skilled in the art may design alternative embodiments without departing the scope of the appended claims. In the claims, any reference sign placed between the parentheses shall not be construed as limiting to a claim. The word "comprise" does not exclude the presence of an element or a step not listed in a claim. The word "a" or "an" preceding an element does not exclude the presence of a plurality of such elements. The invention may be implemented by means of a hardware comprising several distinct elements and by means of a suitably programmed computer. In a unit claim enumerating several devices, several of the devices may be embodied by one and the same hardware item. Use of the words first, second, and third, etc. does not mean any ordering. Such words may be construed as naming.

Furthermore, it is also to be noted that the language used in the description is selected mainly for the purpose of readability and teaching, but not selected for explaining or defining the subject matter of the invention. Therefore, for those of ordinary skills in the art, many modifications and variations are apparent without departing the scope and spirit of the appended claims. For the scope of the invention, the disclosure of the invention is illustrative, but not limiting, and the scope of the invention is defined by the appended claims.

The invention claimed is:

1. A system for asynchronous interface presentation, comprising:
   a first terminal having at least one processor to receive a request message for saving a first user interface, capture interface information based on the request message, and upload the interface information to a network storage server;
   a second terminal having at least one second processor to receive a triggering instruction, send the network storage server a request for invoking the interface information, construct a second user interface based at least on the invoked interface information, and present the constructed second user interface on the second terminal, wherein the constructed second user interface is executable by the second terminal, a presentation of the constructed second user interface on the second terminal is independent from an operating state of the first terminal and an interface display state of the first terminal; and
   the network storage server having at least one third processor to store the interface information uploaded by the first terminal, and provide the second terminal with an interface for invoking the interface information.

2. The system for asynchronous interface presentation as claimed in claim 1, wherein when the second terminal presents the constructed second user interface, the first terminal is in a switched-on state or a switched-off state.

3. The system for asynchronous interface presentation as claimed in claim 1, wherein the constructed second user interface presented by the second terminal corresponds to the interface information saved by the network storage server.

4. The system for asynchronous interface presentation as claimed in claim 1, wherein the interface information of the first terminal comprises: elements on the first user interface of the first terminal, background information of the first user interface of the first terminal, and layout information of the elements on the first user interface of the first terminal.

5. The system for asynchronous interface presentation as claimed in claim 4, wherein when an element on the first user interface of the first terminal is a shortcut icon, the first terminal locates a target file corresponding to the shortcut icon, and uploads the target file to the network storage server.

6. The system for asynchronous interface presentation as claimed in claim 1, wherein the second terminal displays the constructed second user interface in a standalone window, or displays the constructed second user interface using a full-screen display window.

7. The system for asynchronous interface presentation as claimed in claim 4, wherein the interface information of the first terminal further comprises task information in a taskbar of the first terminal, and the task information comprises a uniform resource locator (URL) and/or a file currently opened by a user.

8. The system for asynchronous interface presentation as claimed in claim 7, wherein when the task information is the file currently opened by the user, the first terminal determines whether the file is displayed on the first user interface, and if the file is displayed on the first user interface, indicates a status of the file as being opened, and uploads a file name and the status of the file to the network storage server, otherwise, locates a storage location of the file, indicates the status of the file as being opened after obtaining the file, and uploads the file and the status to the network storage server.

9. The system for asynchronous interface presentation as claimed in claim 7, wherein the first terminal, when the task information is the URL, captures the URL, and uploads the URL to the network storage server.

10. The system for asynchronous interface presentation as claimed in claim 7, wherein the second terminal constructs the second user interface based on the elements of the first user interface of the first terminal and the layout information of the elements, and displays the constructed second user interface in a standalone window, or displays the constructed second user interface using a full-screen display window, and constructs a taskbar in the full-screen display window, and creates a task corresponding to the task information in the taskbar.

11. The system for asynchronous interface presentation as claimed in claim 10, wherein the second terminal after presenting the constructed second user interface, receives an instruction to perform an operation on one of the elements and/or the task in the constructed second user interface.

12. A terminal for asynchronous interface presentation, comprising:
    an interface storage device to receive a request message for saving a first user interface, capture interface information based on the request message, and upload the interface information to a network storage server; and
    an interface display device to receive a triggering instruction, send the network storage server a request for invoking the interface information, construct a second user interface based at least on the invoked interface information, and asynchronously present the constructed second user interface, wherein the constructed second user interface is executable by the interface display device, a presentation of the constructed second user interface is independent from an operating state of the interface storage device and an interface display state of the interface storage device.

13. The terminal for asynchronous interface presentation as claimed in claim 12, wherein the constructed second user interface presented by the interface display device corresponds to the interface information saved by the network storage server, wherein the interface display device displays the constructed second user interface in a standalone window, or displays using a full-screen display window.

14. The terminal for asynchronous interface presentation as claimed in claim 12, wherein in the interface storage device, the interface information comprises: elements on the first user interface of the terminal, background information of the first user interface of the terminal, layout information of the elements on the first user interface, and task information in a taskbar of the terminal, wherein the task information comprises a uniform resource locator (URL) and/or a file currently opened by a user.

15. The terminal for asynchronous interface presentation as claimed in claim 14, wherein the interface storage device, when an element on the first user interface of the terminal is a shortcut icon, locates a target file corresponding to the shortcut icon, and uploads the target file to the network storage server.

16. The terminal for asynchronous interface presentation as claimed in claim 15, wherein the interface storage device further comprises:
    a first storage device to, when the task information is a file currently opened by a user, determine whether the file is displayed on the first user interface, and if the file is displayed on the first user interface, indicate a status of the file as being opened, and upload a file name and the status of the file to the network storage server, otherwise, locate a storage location of the file, indicate the status of the file as being opened after obtaining the file, and upload the file and the status to the network storage server; and a second storage device to, when the task information is the URL, capture the URL, and upload the URL to the network storage server.

17. The terminal for asynchronous interface presentation as claimed in claim 15, wherein the interface display device constructs the second user interface based on the elements of the first user interface and the layout information of the elements, and displays the constructed second user interface in a standalone window, or displays the constructed second user interface using a full-screen display window, constructs a taskbar in the full-screen display window, and creates a task corresponding to the task information in the taskbar.

18. The terminal for asynchronous interface presentation as claimed in claim 17, wherein the interface display device, after presenting the constructed second user interface, receives an instruction to perform an operation on one of the elements and/or the task in the constructed second user interface.

19. A non-transitory computer readable medium having instructions stored thereon that, when executed by at least one processor, cause the at least one processor to perform operations for asynchronous interface presentation, comprising:

receiving a request message by a first terminal for saving a first user interface, capturing interface information based on the request message, and uploading the interface information to a network storage server; and receiving a triggering instruction by a second terminal, sending the network storage server a request for invoking the interface information, constructing a second user interface based at least on the invoked interface information, and presenting the constructed second user interface on the second terminal, wherein the constructed second user interface is executable by the second terminal, a presentation of the constructed second user interface on the second terminal is independent from an operating state of the first terminal and an interface display state of the first terminal.

* * * * *